(12) United States Patent
Tian et al.

(10) Patent No.: US 12,483,746 B2
(45) Date of Patent: Nov. 25, 2025

(54) DISPLAY METHOD, APPARATUS, DEVICE AND STORAGE MEDIUM

(71) Applicant: Beijing Zitiao Network Technology Co., Ltd., Beijing (CN)

(72) Inventors: Yumo Tian, Beijing (CN); Xiaoshuang Bai, Beijing (CN); Hui Sun, Beijing (CN); Qi Xu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 18 days.

(21) Appl. No.: 18/540,778

(22) Filed: Dec. 14, 2023

(65) Prior Publication Data

US 2024/0121468 A1    Apr. 11, 2024

Related U.S. Application Data

(63) Continuation of application No. PCT/CN2022/117507, filed on Sep. 7, 2022.

(30) Foreign Application Priority Data

Sep. 8, 2021  (CN) .......................... 202111051679.3

(51) Int. Cl.
*H04N 21/431*  (2011.01)
*H04N 5/272*  (2006.01)
*H04N 21/2743*  (2011.01)

(52) U.S. Cl.
CPC ......... *H04N 21/4316* (2013.01); *H04N 5/272* (2013.01); *H04N 21/2743* (2013.01)

(58) Field of Classification Search
CPC .......... H04N 21/4316; H04N 21/2743; H04N 21/4318; H04N 21/432; H04N 5/272; H04N 5/28

(Continued)

(56) References Cited

U.S. PATENT DOCUMENTS 11,922,974 B1 *  3/2024  Plankey ............. G06Q 30/0641
2007/0250901 A1 * 10/2007  McIntire .......... H04N 21/47815
                                                      348/E7.071

(Continued)

FOREIGN PATENT DOCUMENTS

CN    107391732 A    11/2017
CN    108377334 A    8/2018

(Continued)

OTHER PUBLICATIONS

International Patent Application No. PCT/CN2022/117507; Int'l Search Report; dated Nov. 29, 2022; 2 pages.

(Continued)

*Primary Examiner* — John W Miller
(74) *Attorney, Agent, or Firm* — BakerHostetler

(57) ABSTRACT

Embodiments of the present disclosure disclose a display method, apparatus, device and storage medium. The method includes: displaying a media stream display interface, the media stream display interface including first media content, the media stream including first media content and second media content; in response to determining that predetermined media content switching for the media stream display interface is detected, switching the first media content of the (Continued)

media stream display interface to the second media content; where the second media content or the first media content includes information of a predetermined theme and a predetermined control associated with the predetermined theme, and the predetermined control is configured to post target content associated with the predetermined theme.

18 Claims, 7 Drawing Sheets

(58) Field of Classification Search
USPC .......................................................... 348/564
See application file for complete search history.

(56) References Cited

U.S. PATENT DOCUMENTS

| | | | | |
|---|---|---|---|---|
| 2009/0119737 | A1* | 5/2009 | Perlman | H04N 21/6125 |
| | | | | 725/133 |
| 2009/0320073 | A1* | 12/2009 | Reisman | H04N 21/482 |
| | | | | 709/227 |
| 2010/0031149 | A1* | 2/2010 | Gentile | H04N 5/91 |
| | | | | 348/135 |
| 2014/0059606 | A1* | 2/2014 | Selim | H04N 21/42222 |
| | | | | 725/38 |
| 2016/0381109 | A1* | 12/2016 | Barnett | H04N 21/4622 |
| | | | | 709/231 |
| 2019/0087856 | A1* | 3/2019 | Liu | G06Q 30/0255 |
| 2020/0236278 | A1* | 7/2020 | Yeung | H04N 21/2187 |
| 2023/0318997 | A1* | 10/2023 | Rathod | H04N 21/254 |
| | | | | 709/203 |

FOREIGN PATENT DOCUMENTS

| | | | |
|---|---|---|---|
| CN | 112291603 | A | 1/2021 |
| CN | 112307393 | A | 2/2021 |
| CN | 112492355 | A | 3/2021 |
| CN | 112506396 | A | 3/2021 |
| CN | 113259740 | A | 8/2021 |
| CN | 113721810 | A | 11/2021 |
| JP | 2014-011597 | A | 1/2014 |

OTHER PUBLICATIONS

European Patent Application No. 22866633.5; Extended Search Report; dated Aug. 7, 2024;13 pages.
Japanese Patent Application No. 2023-578848; First Office Action dated Jan. 21, 2025, 6 pages with machine translation.

* cited by examiner

```
                                                                                    101
┌────────────────────────────────────────────────────────────────────────────┐
│   DISPLAY A MEDIA STREAM DISPLAY INTERFACE, THE MEDIA STREAM DISPLAY INTERFACE │
│ INCLUDING FIRST MEDIA CONTENT, THE MEDIA STREAM INCLUDING THE FIRST MEDIA CONTENT │
│                         AND SECOND MEDIA CONTENT                            │
└────────────────────────────────────────────────────────────────────────────┘
                                      │
                                      ▼
┌────────────────────────────────────────────────────────────────────────────┐
│   WHEN PREDETERMINED MEDIA CONTENT SWITCHING FOR THE MEDIA STREAM DISPLAY   │   102
│ INTERFACE IS DETECTED, SWITCH THE FIRST MEDIA CONTENT OF THE MEDIA STREAM DISPLAY │
│  INTERFACE TO THE SECOND MEDIA CONTENT; WHERE THE SECOND MEDIA CONTENT INCLUDES │
│   INFORMATION OF A PREDETERMINED THEME AND A PREDETERMINED CONTROL ASSOCIATED │
│  WITH THE PREDETERMINED THEME, OR THE FIRST MEDIA CONTENT INCLUDES INFORMATION OF │
│       A PREDETERMINED THEME AND A PREDETERMINED CONTROL ASSOCIATED WITH THE │
│      PREDETERMINED THEME, THE PREDETERMINED CONTROL BEING CONFIGURED TO POST │
│               TARGET CONTENT ASSOCIATED WITH THE PREDETERMINED THEME         │
└────────────────────────────────────────────────────────────────────────────┘
```

FIG. 1

```
                                                                                    201
┌────────────────────────────────────────────────────────────────────────────┐
│      DISPLAY A MEDIA STREAM DISPLAY INTERFACE, WHERE THE MEDIA STREAM DISPLAY │
│                   INTERFACE INCLUDES FIRST MEDIA CONTENT                    │
└────────────────────────────────────────────────────────────────────────────┘
                                      │
                                      ▼
┌────────────────────────────────────────────────────────────────────────────┐
│   WHEN PREDETERMINED MEDIA CONTENT SWITCHING FOR THE MEDIA STREAM DISPLAY   │   202
│ INTERFACE IS DETECTED, SWITCH THE FIRST MEDIA CONTENT OF THE MEDIA STREAM DISPLAY │
│    INTERFACE TO THE SECOND MEDIA CONTENT, WHERE THE SECOND MEDIA CONTENT INCLUDES │
│    A PREDETERMINED MEDIA RESOURCE ASSOCIATED WITH THE PREDETERMINED THEME AND A │
│    PREDETERMINED CONTROL ASSOCIATED WITH THE PREDETERMINED THEME, AND THE   │
│    PREDETERMINED MEDIA RESOURCE INCLUDES A MEDIA RESOURCE GENERATED USING A │
│                        PREDETERMINED CAPTURING TEMPLATE                     │
└────────────────────────────────────────────────────────────────────────────┘
                                      │
                                      ▼
┌────────────────────────────────────────────────────────────────────────────┐
│               IN RESPONSE TO TRIGGERING FOR A PREDETERMINED CONTROL,         │   203
│                          ENTER THE CAPTURING INTERFACE                       │
└────────────────────────────────────────────────────────────────────────────┘
                                      │
                                      ▼
┌────────────────────────────────────────────────────────────────────────────┐
│      OBTAIN AN IMAGE BASED ON THE CAPTURING INTERFACE, AND USE A PREDETERMINED │   204
│   CAPTURING TEMPLATE AND THE IMAGE TO GENERATE TARGET CONTENT TO BE POSTED  │
└────────────────────────────────────────────────────────────────────────────┘
```

DISPLAY METHOD, APPARATUS, DEVICE AND STORAGE MEDIUM

This application is a continuation of International Patent Application No. PCT/CN/2022/117507, filed on Sep. 7, 2022, which claims priority to the Chinese patent application filed with the Chinese Patent Application No. 202111051679.3, filed on Sep. 8, 2021, both of which are incorporated herein by reference in their entireties.

TECHNICAL FIELD

The embodiment of the present disclosure relates to the field of computer technology, for example, to a display method, apparatus, device and storage medium.

BACKGROUND

With rapid development of Internet technology, a variety of applications emerge endlessly, providing users with increasingly rich interaction patterns and interactive experiences.

In some application platforms, users can post various forms of media resources such as pictures, audios, or videos for other users to view. For a user, he/she can post media resources and browse media resources posted by other users. For users who are used to browsing media resources, they may not be used to post media resources, which affects the richness of media resources on the application platform and the interactivity of users.

SUMMARY

The embodiments of present disclosure provide a display method, apparatus, storage medium and device, which may improve the solution of displaying media contents in the related art.

In a first aspect, the embodiment of present disclosure provides a display method, including:
  displaying a media stream display interface, the media stream display interface including first media content, the media stream including first media content and second media content;
  when predetermined media content switching for the media stream display interface is detected, switching the first media content of the media stream display interface to the second media content;
  where the second media content includes information of a predetermined theme and a predetermined control associated with the predetermined theme, or the first media content includes information of a predetermined theme and a predetermined control associated with the predetermined theme, and the predetermined control is configured to post target content associated with the predetermined theme.

In a second aspect, the present embodiment provides a display apparatus, including:
  an interface display module configured to display a media stream display interface, where the media stream display interface includes first media content, and the media stream includes first media content and second media content;
  a content switching module configured to switch the first media content of the media stream display interface to the second media content when predetermined media content switching for the media stream display interface is detected; where the second media content includes information of a predetermined theme and a predetermined control associated with the predetermined theme, or the first media content includes information of a predetermined theme and a predetermined control associated with the predetermined theme, and the predetermined control is configured to post target content associated with the predetermined theme.

In a third aspect, the present disclosure provides an electronic device including a memory, a processor and a computer program stored on the memory and runnable on the processor, the processor implements the display method as provided by the embodiments of the present disclosure when executing the computer program.

In a fourth aspect, the present disclosure provides a computer-readable storage medium having a computer program stored thereon, the computer program executes the display method as provided by the embodiments of the present disclosure when executing the computer program.

BRIEF DESCRIPTION OF THE DRAWINGS

FIG. 1 is a schematic flowchart of a display method provided in the embodiment of the present disclosure;

FIG. 2 is a schematic flowchart of another display method provided in the embodiment of the present disclosure;

DETAILED DESCRIPTION

Figure 3:
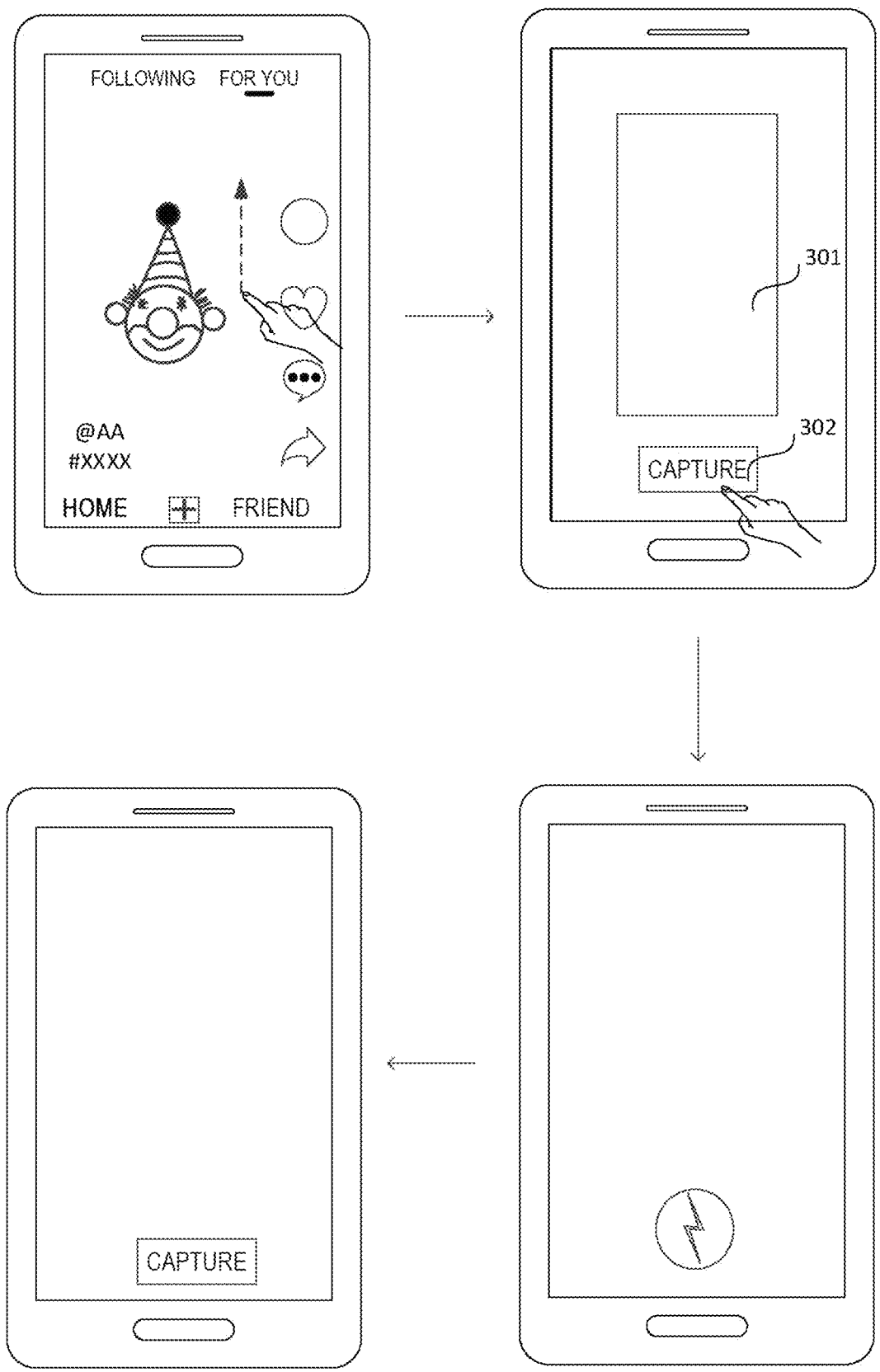
FIG. 3 is an interactive schematic diagram of a display method provided in the embodiment of the present disclosure.

It should be understood that the various steps described in the method implementation of this disclosure can be executed in different orders and/or in parallel. In addition, the method implementation can include additional steps and/or the steps as shown may be omitted. The scope of this disclosure is not limited in this regard.

The term "including" and its variations as used herein are non-exclusive inclusion, i.e. "including but not limited to". The term "based on" means "at least partially based on". The term "one embodiment" means "at least one embodiment"; the term "another embodiment" means "at least one additional embodiment"; and the term "some embodiments" means "at least some embodiments". Relevant definitions of other terms will be given in the following description.

It should be noted that the concepts of "first" and "second" mentioned in this disclosure are only used to distinguish different apparatuses, modules, or units, but are not used to limit the order or interdependence of the functions performed by these apparatuses, modules, or units.

It should be noted that the modifications of "one" and "a plurality of" mentioned in this disclosure are illustrative but not limiting. Those skilled in the art should understand that unless otherwise indicated in the context, they should be understood as "one or more".

The names of the messages or information interacted between a plurality of apparatuses in this public implementation are for illustrative purposes only, which are not intended to limit the scope of these messages or information.

In the following plurality of embodiments, each embodiment provides exemplary features and examples simultaneously, a plurality of features described in the embodiment may be combined to form a plurality of exemplary solutions, each numbered embodiment should not be regarded as only one technical solution.

FIG. 1 is a schematic flowchart of a display method provided by the present disclosure, which can be performed by a display apparatus, where the apparatus can be implemented by software and/or hardware, and can generally be integrated in an electronic device. As shown in FIG. 1, the method includes:

At Step 101, a media stream display interface is displayed, the media stream display interface including first media content, the media stream including first media content and second media content.

In the embodiments of the present disclosure, the media stream display interface may be an interface in a predetermined application, and the predetermined application may provide a media stream display function, which can be installed in electronic devices such as mobile phones, tablets, or computers. Users can register accounts in the predetermined application and log in to the predetermined application. The media stream may include image content, audio content and video content, which can be played on the media stream display interface. Generally, a plurality of pieces of media content can be played continuously under user operation. The media content can include pictures, audios, or videos, and is generally presented in the form of works, such as comics, songs, or short videos. Users can upload the works they need to post to the server end corresponding to the predetermined application, and the server may send the works to the predetermined application used by other users for display. Taking a specific application scenario as an example, the predetermined application includes a short video application, and the media resource includes a short video; the short video application is configured to play short videos posted by users. The video author may upload his/her own short video works to the short video platform, and the short video platform can send the short video works to short video applications used by other users for display. Other users can watch the short video works posted by the video author on the media stream display interface.

It should be noted that one or more media stream display interfaces can be provided in the predetermined application, and the sources of media content played in different media stream display interfaces may be different. For example, for short video applications, it may include Video For You interface and Friend interface. The media content played in the Video For You interface may come from media content posted by any user in the predetermined application; the media content played in the Friend interface may come from media resources posted by a user who has a friend relationship with the current user. The media stream display interface involved in this embodiment of the present disclosure may include all media stream display interfaces in the predetermined application, or any one or more predetermined media stream display interfaces in the predetermined application.

As an example, the first media content can be understood as the media content currently played in the media stream display interface, and the second media content can be understood as the media content available for display in the media stream other than the first media content.

At Step 102, when predetermined media content switching for the media stream display interface is detected, the first media content of the media stream display interface is switched to the second media content; where the second media content includes information of a predetermined theme and a predetermined control associated with the predetermined theme, or the first media content includes information of a predetermined theme and a predetermined control associated with the predetermined theme, and the predetermined control is configured to post target content associated with the predetermined theme.

In the embodiment of the present disclosure, the media content played in the media stream display interface may include information of a predetermined theme and a predetermined control associated with the predetermined theme. The predetermined theme can be understood as a theme that is recommended to the current user for content posting. By displaying information of the predetermined theme, the user can be reminded to post media content related to the theme. The predetermined control can be understood as an operation entrance for posting the target content associated with the predetermined theme. With the display of the predetermined control, the difficulty in posting content by the user can be further reduced, thereby improving the enthusiasm of users in posting new content and increasing the probability of users in posting new content. The target content can be understood as the content associated with the predetermined theme that the current user is about to post.

In this embodiment of the present disclosure, the specific presentation form of the information of the predetermined theme and predetermined control is not limited. For example, the information of the predetermined theme can be displayed through text, pictures or videos. Taking a specific theme as an example, assuming that the predetermined theme is student days, media content may include text such as "Share your student days", and pictures such as graduation photos and videos such as videos during student military training may also be included. The content for displaying the predetermined theme may include content provided by the predetermined application platform, content posted by users other than the current user in the predetermined application, and content related to the current user, etc., without any specific limitation.

For example, a predetermined condition can be set for the information of the predetermined theme and the timing when the predetermined control appears. When a predetermined condition is met, media content containing the predetermined theme and predetermined control can be played in the media stream display interface. For example, the predetermined condition can be associated with the current user, so that the predetermined theme and predetermined control can be displayed to the current user at a more appropriate time. The predetermined condition can be set according to actual needs. Generally, factors such as whether the user is a new user of the predetermined application, the time when the user last publicly posts media content, the frequency at which the user publicly posts the media resources recently, and the number of times that the predetermined theme has been displayed to the user, can be considered.

For example, the predetermined condition include at least one of the following: the current user has not posted media content within the latest first predetermined duration; the accumulated quantity of pieces of media content posted by the current user within the latest second predetermined duration is less than the predetermined quantity threshold; the media content containing the predetermined theme and predetermined control has not been played for the current user within the latest third predetermined duration; the accumulated number of times that the media content containing the predetermined theme and predetermined control is played for the current user within the latest fourth predetermined duration is less than the predetermined threshold for number of times; or a plurality of pieces of media content in a predetermined media stream queue corresponding to the media stream display interface have been displayed to the current user. A predetermined prompt condition can be reasonably set to ensure the prompt effect. In order to more accurately determine the prompt timing, the predetermined prompt condition can be set by combining the above two or more conditions.

The first predetermined duration, the second predetermined duration, the third predetermined duration, and the fourth predetermined duration can be set according to actual needs. The plurality of predetermined durations can be equal or unequal. For example, the first predetermined duration may be 1 month. If the current user has not publicly posted media content in the past 1 month, the predetermined condition is met. The predetermined quantity threshold can be set according to the second predetermined duration. For example, the second predetermined duration is 2 months, and the predetermined quantity threshold is 3. If less than 3 pieces of media content is publicly posted by the current user in the past 2 months, the predetermined condition is met.

For example, the media stream display interface generally corresponds to a media stream queue, and the predetermined application may play the media content sequentially according to the arrangement order of the media content in the media stream queue. A predetermined media stream queue can be determined according to the corresponding recommendation algorithm, and can be updated in real-time, regularly, or when an event is triggered. If a plurality of pieces of media content in the predetermined media stream queue have been viewed by the current user, it is temporarily impossible to push unviewed media content to the user in the current media stream display interface. Users can be prompted to post media content by themselves, which enriches functions of the predetermined application, and improves the user experience. For example, for a Friend interface, if the number of users who have a friend relationship with the current user (referred to as friend users) is small, or the number of short videos recently posted by friend users is small, the current user may complete the browse of unviewed short videos in a short time, or even there are no unviewed short videos when entering the friend interface. At this time, it can be considered that the predetermined condition is met.

For example, the information of the predetermined theme and the predetermined control associated with the predetermined theme can be included in the first media content. In this case, the first media content may include a media content first played when entering the media stream display interface. It can be understood that before entering the media stream display interface, or after the media stream display interface is entered but before the first media content is firstly played, it is determined that the predetermined condition is met, and the information of the predetermined theme and the predetermined control are displayed to the current user by playing the first media content. If the current user wants to post target content associated with the predetermined theme, it can be posted through the predetermined control; if the current user wants to continue browsing the media content, he/she can input predetermined media content switching for the media stream display interface, so that the first media content played in the media stream display interface is switched to the second media content. The specific form and input mode of the predetermined media content switching are not limited, for example, it can be upward swiping acted on the media stream display interface.

For example, the information of the predetermined theme and the predetermined control associated with the predetermined theme can be included in the second media content. In this case, the first media content can include any media content played after entering the media stream display interface. When the predetermined media content switching for the media stream display interface is detected, the first media content of the media stream display interface is switched to the second media content containing the predetermined theme and predetermined control, when it is determined that the set condition is met.

The display method provided in the embodiment of the present disclosure displays a media stream display interface, the media stream display interface includes first media content, the media stream includes first media content and second media content; and when predetermined media content switching for the media stream display interface is detected, switches the first media content of the media stream display interface to the second media content, where the second media content includes information of the predetermined theme and the predetermined control associated with the predetermined theme, or the first media content includes information of the predetermined theme and the predetermined control associated with the predetermined theme, and the predetermined control is configured to post target content associated with the predetermined theme. By adopting the above technical solution, the media content in the media stream display interface contains information about the predetermined theme and the control associated with the predetermined theme. In the process of browsing media content in the media stream display interface by the user, the predetermined theme and corresponding control can prompt the user to post content associated with the predetermined theme, help the user determine the theme of the content to be posted, reduce the difficulty of content posting, improve the enthusiasm of users in posting new content, and then increase the probability of users in posting new content and enrich media content in the application platform, which is also conducive to improving activity of the users, improving traffic efficiency of the application, and improving the utilization rate of related resources such as the corresponding platform or server.

In some embodiments, when the second media content includes information of a predetermined theme and a predetermined control associated with the predetermined theme, the second media content includes at least one predetermined media resource associated with the predetermined theme; or when the first media content includes information of a predetermined theme and a predetermined control associated with the predetermined theme, the first media content includes at least one predetermined media resource associated with the predetermined theme. In a process in which the user browses media content played in the media stream display interface, the predetermined media resource associated with the predetermined theme is played. By using the predetermined media resource to provide more intuitive reference information for the current user, the difficulty in posting media content for the current user is reduced, which is conductive for increasing the probability of posting media content after viewing the second media content. It should be noted that description is provided in the following text by taking the second media content as an example, and the relevant scheme can also be applied to the first media content.

In some embodiments, the predetermined control is configured to post the target content based on the predetermined media resource. The predetermined media resource can not only be used as reference information, but also can be directly applied in post of new content through the predetermined control, which further reduces the cost in posting new content.

In some embodiments, the predetermined media resource may include a media resource that can serve as an example; it may also include a media resource having an association relationship with the current user. The specific association relationship is not limited, for example, it may include a media resource that the current user has already completed or a media resource that is in the production process but has not yet posted, such as a media resource stored in the draft box; it may also include media material stored in the electronic device by the current user that can be directly posted as the media resource, such as video files; and it may also include media content that the current user has browsed or posted in the predetermined application.

In some embodiments, the predetermined media resource includes at least one predetermined template associated with the predetermined theme and/or a media resource generated using the at least one predetermined template, and the predetermined template includes generation mode information of the media resource. The predetermined template can match the predetermined theme. By playing the predetermined media resource, the current user can more intuitively view the effect of the predetermined template or the effect of the media resource generated using the predetermined template, which is convenient for users to use the predetermined template to post target content, and thus improving content posting efficiency, and also making the posted content more in line with the predetermined theme.

For example, in order to improve the quality of the posted media content and attract more users to watch, the user may perform some processing when producing media content, and the processing may be more complicated. If all are manually completed by users, more effort is required and the difficulty in posting media content is increased. Therefore, a predetermined template can be provided to the user, and the predetermined template includes generation mode information, so that the user can directly use the predetermined template and personalized media materials prepared by themselves to generate media content that matches the effect of the predetermined template.

For example, when the predetermined media resource includes a plurality of predetermined templates associated with the predetermined theme, if the plurality of predetermined templates correspond to different types, the media content can be generated using the plurality of predetermined templates. When the predetermined media resource includes media resources generated using the plurality of predetermined templates, if the plurality of predetermined templates correspond to different types, the media content can be generated using the plurality of predetermined templates. For example, if the plurality of predetermined templates include a predetermined capturing template and a predetermined editing template, both templates can be used simultaneously to generate the target content.

In some embodiments, the predetermined template includes a predetermined capturing template, and the generation mode information corresponding to the predetermined capturing template includes image processing information and/or sound effect processing information involved in a capturing process of the media material. The image processing can include, for example, adding beauty effects, adding stickers or stylization processing (such as animation style, sketch style or oil painting style, etc.), etc., and the sound effect processing can include adding background music or adjusting voiceover effects, etc. The corresponding information can include algorithms or material required to implement the corresponding processing method. In addition, the image processing information and sound effect processing information may co-exist, for example, it can be a predetermined capturing template produced for a certain theme (such as the Olympic theme), which may include the Olympic theme song, etc.

In some embodiments, the predetermined template includes a predetermined editing template, and the generation mode information corresponding to the predetermined editing template includes editing mode information of the media material. The predetermined application may have an editing function, and the editing function can be understood as a function of selecting, cutting, splicing or arranging media material to obtain a media resource such as an edited video. The editing template is used to edit media material to obtain a media resource such as an edited video. The editing template can contain editing mode information, and the editing template is used to indicate that the media material to be edited is edited into a media resource according to the editing mode in the editing template. That is, the edited video obtained by applying the editing template can match the editing mode contained in the editing template, thus achieving the effect of editing. The media material can include pictures, videos or audios, for example.

In the media stream display interface, a predetermined media resource generated using the predetermined capturing template or the predetermined editing template is played. At this time, the predetermined media resource can be regarded as an example of capturing template or editing template, which allows users to view capturing effect or editing s more intuitively, which is conducive to stimulating the current user's creative inspiration, enhancing creative enthusiasm, and using the predetermined capturing template or predetermined editing template may conveniently produce and post the media resource of the same type, thereby enriching the media content in the predetermined application.

In some embodiments, when the predetermined media resource includes a media resource associated with the current user, the predetermined control is configured to post the target content based on the media resource associated with the current user. Users can directly use the predetermined media resource to post resources through the predetermined control, thus reducing production difficulty and improving posting efficiency.

For example, the media resources associated with the current user may include media resources marked by the current user in a predetermined marking method. The predetermined marking method may include triggering a like control, triggering a favorite control, or adding to the draft box, etc., that is, the predetermined media resource may include a media resource that the user likes, saved as favorite, or has previously saved in the draft box. In addition, the predetermined media resource may also include a media resource that the user has historically posted. For example, a user can directly post the predetermined media resource as target content to be posted, and can also obtain the target content to be posted after further editing on the basis of the predetermined media resource and then post it.

For example, the predetermined media resource can be media content posted in a historical period corresponding to the current time (such as the same date as today in previous years). At this time, the media content can be reposted through the predetermined control, or media material of this period (such as this year) can be added on the basis of the media content to obtain the target content and then the target content is posted.

In some embodiments, when the predetermined media resource includes at least one predetermined template associated with the predetermined theme and/or a media resource generated using the at least one predetermined template, the predetermined control is configured to post the target content based on the at least one predetermined template. Through the predetermined control, the predetermined template can be conveniently used to generate media content that needs to be posted, which further improves the posting efficiency of media content.

In some embodiments, the predetermined control is configured to post the target content by using the media resource generated using the at least one predetermined template. Through the predetermined control, the media resource generated using the at least one predetermined template can be conveniently used to post the media content, which further improves the efficiency in posting media content.

In some embodiments, there are a plurality of the predetermined media resources. This can provide users with more choices and improve the flexibility of content posting. For example, some or all of the plurality of the predetermined media resources may correspond to the same predetermined theme, or each predetermined media resource may correspond to a different predetermined theme. When the predetermined media resources include media resources generated using a predetermined template, some or all of the plurality of the predetermined media resources may correspond to the same predetermined template, or each predetermined media resource can correspond to a different predetermined template.

In some embodiments, when the second media content or the first media content is played in the media stream display interface, the method includes: sequentially playing a plurality of predetermined media resources in the media stream display interface. This can automatically push a plurality of predetermined media resources to the user continuously, making it easier for the user to view richer predetermined media resources. For the case where the plurality of predetermined media resources correspond to the same predetermined template, the effect of the predetermined template can be viewed more comprehensively through a plurality of examples, which facilitates the current user to more accurately determine whether to use the predetermined template or not; for the case where the plurality of the predetermined media resources correspond to a plurality of predetermined templates, the effect of different predetermined templates can be viewed sequentially, which facilitates the current user to select the desired predetermined template.

In some embodiments, when the second media content or the first media content is played in the media stream display interface, the method includes: displaying a plurality of predetermined media resources at a plurality of display positions in the media stream display interface. This can push a plurality of predetermined media resources to the user at once, making it easy for the user to quickly view richer predetermined media resources. The specific number of the display positions is not limited. Generally, one predetermined media resource is played at one display position. The distribution of display positions is not limited and can be set with reference to the number of display positions. For example, if there are four display positions, a distribution method similar to the "⊞" shape can be designed in the media stream display interface. For the case where the plurality of predetermined media resources correspond to the same predetermined template, the effect of the predetermined template can be viewed more comprehensively in batches through the plurality of examples, which is convenient for the current user to more accurately determine whether the predetermined template is applicable. For the case where the plurality of predetermined media resources correspond to a plurality of predetermined templates, the effect of different predetermined templates can be viewed in batches, which is convenient for the current user to quickly select the desired predetermined template. For example, there may be a plurality of predetermined controls, and the specific number can be the same as the number of display positions.

In some embodiments, after displaying the predetermined control, the method further includes: displaying a posting process interface based on the predetermined theme, the posting process interface including a material selection interface, a capturing interface or a posting interface. The posting process interface may include interfaces involved during posting media content, which generally includes at least one of a material selection interface, a capturing interface, or a posting interface, and it may also include other interfaces.

In some embodiments, when the posting process interface includes a material selection interface, the method further includes: in response to triggering for the predetermined control, entering a media material obtaining interface; obtaining media material based on the media material obtaining interface, and generating target content to be posted using the predetermined editing template and the media material. Users can conveniently enter the media material obtaining interface by triggering the predetermined control, obtain media material stored locally on the electronic device (such as pictures or videos stored in albums, and audio stored in other folders, etc.) through the interface, and use the predetermined editing template to edit the obtained media material to generate target content to be posted, thereby improving the generation efficiency and posting efficiency of media content.

In some embodiments, when the posting process interface includes a capturing interface, the method further includes: in response to triggering for the predetermined control, entering the capturing interface; obtaining an image based on the capturing interface, and generating target content to be posted using the predetermined capturing template and the image. Users can conveniently enter the capturing interface by triggering the predetermined control, and the material (such as stickers, etc.) involved in the predetermined capturing template can be loaded through the interface, and it is convenient for users to preview the capturing effect in real time on the capturing interface, and use the predetermined capturing template to process the image obtained in real time to generate the target content to be posted, thus improving the generation efficiency and posting efficiency of media content.

In some embodiments, when the posting process interface includes a posting interface, the method further includes: in response to triggering for the predetermined control, entering the posting interface; generating target content to be posted based on the media resource associated with the current user and/or the predetermined template. Users can conveniently enter the posting interface by triggering the predetermined control, and a target content to be posted is quickly generated based on media resource associated with the current user and/or predetermined template and then the be posted, thus further improving posting efficiency.

FIG. 2 is a schematic flowchart of another display method provided in the present embodiment, the present embodiment is refined based on a plurality of exemplary solutions in the above embodiment of the embodiments of the present disclosure, the method includes the following steps:

At Step 201, a media stream display interface is displayed, the media stream display interface including first media content.

For example, it is assumed that the media stream display interface is a Video For You interface in a short video application. The first media content is any short video in the Video For You interface.

FIG. 3 is an interactive schematic diagram of a display method provided in the embodiment of the present disclosure, as shown in FIG. 3, a short video containing a clown is provided in a Video For You interface.

At Step 202, when predetermined media content switching for the media stream display interface is detected, the first media content of the media stream display interface is switched to the second media content, where the second media content includes a predetermined media resource associated with the predetermined theme and a predetermined control associated with the predetermined theme, and the predetermined media resource includes a media resource generated using a predetermined capturing template.

For example, when the predetermined media content switching for the media stream display interface is detected, whether the predetermined condition is met is determined. The predetermined condition can be, for example, that the current user has not posted media content within the latest first predetermined duration, and the media content containing the predetermined theme and the predetermined control has not been played for the current user within the latest third predetermined duration. If the predetermined condition is met, the first media content of the media stream display interface can be switched to the second media content. If the predetermined condition is not met, the first media content of the media stream display interface can be switched to a third media content different from the second media content.

As shown in FIG. 3, the predetermined media content switching can be upward swiping. When the predetermined condition is met, the second media content is switched to for playing. The second media content includes a dynamically played first media resource 301 that is generated using the predetermined capturing template and associated with the predetermined theme, and the second media content also includes a capturing control 302 (predetermined control). Users can view the capturing effect of the predetermined capturing template on the Video For You interface.

At Step 203, in response to triggering for a predetermined control, the capturing interface is entered.

For example, during a process in which the user views the first media resource 301, if the user is interested in the capturing effect, when he/she wants to capture a short video having similar effect, he/she can click to trigger the capturing control 302, entering the capturing interface.

At Step 204, an image is obtained based on the capturing interface, and a predetermined capturing template and the image are used to generate target content to be posted.

For example, video screens can be shot based on the capturing interface, and short videos to be posted can be generated using the predetermined capturing template and the shot video screens. Then, the user triggers the posting button to complete the post of a new short video.

According to the display method provided by the embodiment of the present disclosure, in the process of browsing media content in the media stream display interface, the user can play a media resource generated using the predetermined capturing template and a predetermined control in the media content, the media resource and predetermined control can prompt the user to post content associated with the predetermined theme embodied in the predetermined capturing template, the user can quickly enter the capturing interface by triggering the predetermined control, and use the real-time shot screen and predetermined capturing template to quickly generate media content to be posted, which can effectively reduce the difficulty in content posting, improve the enthusiasm of users to post new content, enrich media content in the application platform, which is conducive to improving activity of the users and improving the traffic efficiency of the application, and thus improve the utilization rate of related resources such as the corresponding platform or server.

Figure 4:
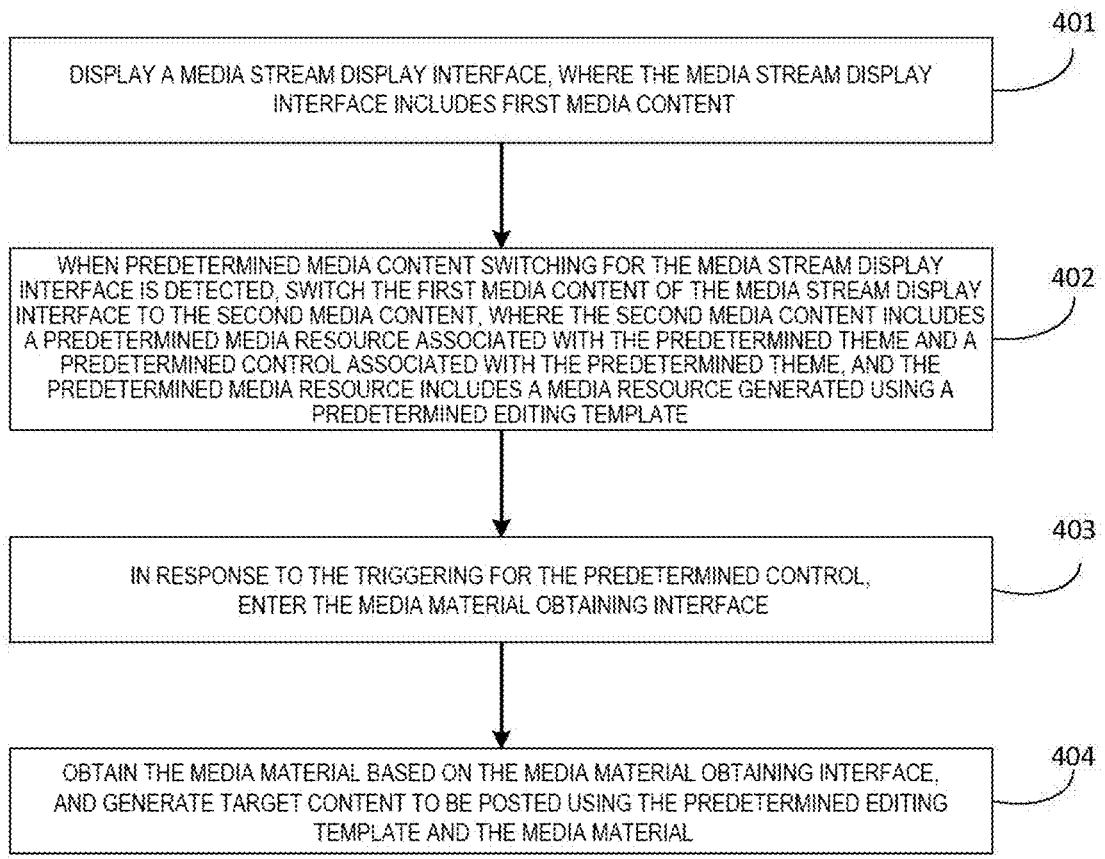
FIG. 4 is a schematic flowchart of another display method provided in the embodiment of the present disclosure.

FIG. 4 is a schematic flowchart of another display method provided in the embodiment of the present disclosure, the present embodiment is refined based on a plurality of solutions in the above embodiment of the embodiments of the present disclosure, the method includes the following steps:

At Step 401, a media stream display interface is displayed, where the media stream display interface includes first media content.

For example, it is assumed that the media stream display interface is a Friend interface in a short video application. The first media content is any short video in the Friend interface.

Figure 5:
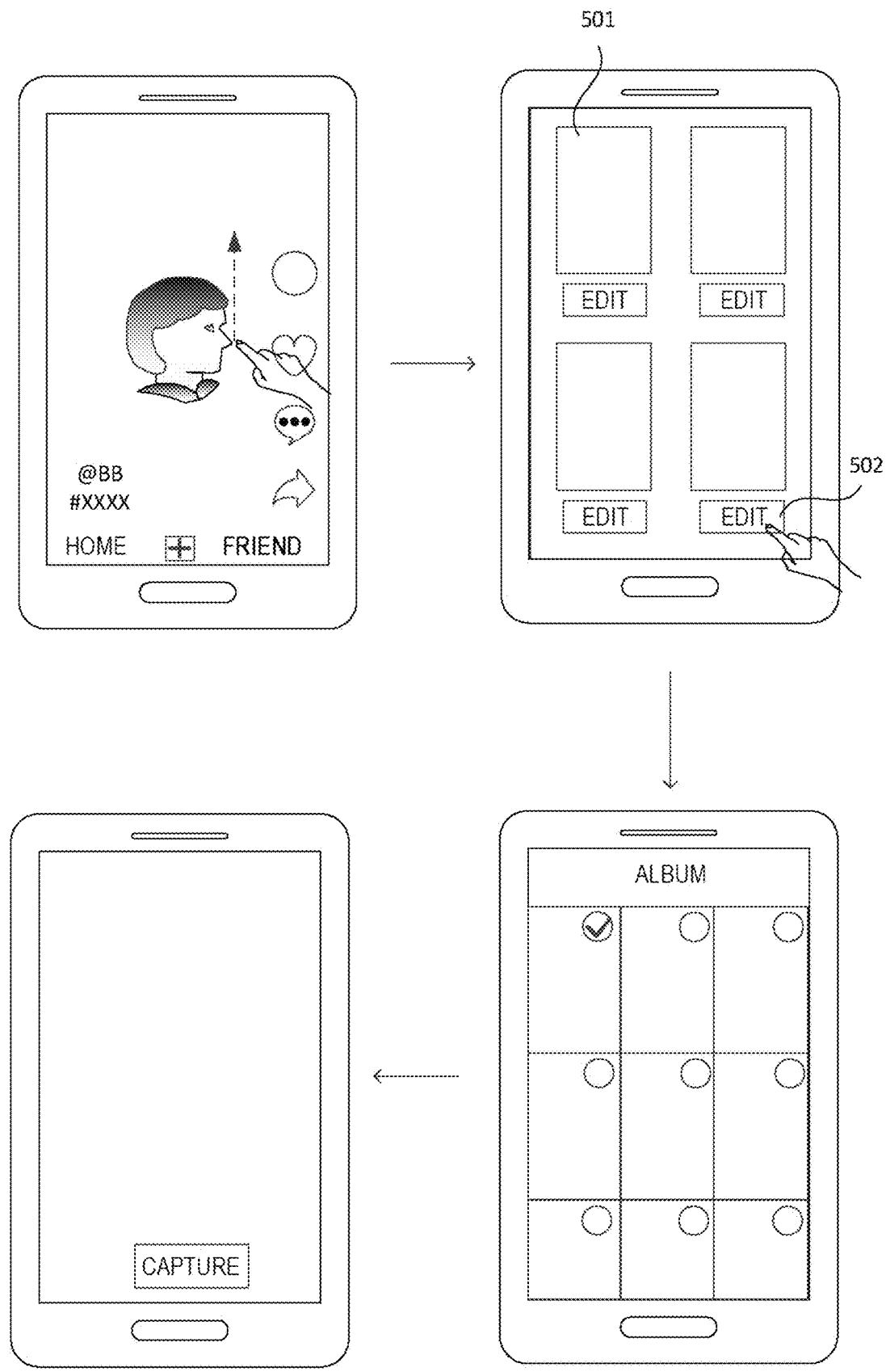
FIG. 5 is an interactive schematic diagram of another display method provided in the embodiment of the present disclosure.

FIG. 5. is an interactive schematic diagram of a display method provided in the embodiment of the present disclosure, as shown in FIG. 5, the selfie short video of the user's friend is provided in the Video For you interface.

At Step 402, when predetermined media content switching for the media stream display interface is detected, the first media content of the media stream display interface is switched to the second media content, where the second media content includes a predetermined media resource associated with the predetermined theme and a predetermined control associated with the predetermined theme, and the predetermined media resource includes a media resource generated using a predetermined editing template.

For example, when the predetermined media content switching for the media stream display interface is detected, whether the predetermined condition is met is determined. The predetermined condition can be, for example, that a plurality of pieces of media content in the predetermined media stream queue corresponding to the media stream display interface have been displayed to the current user, and the current user has not posted media content within the latest first predetermined duration. If the predetermined condition is met, the first media content of the media stream display interface can be switched to the second media content. If the predetermined condition is not met, the first media content of the media stream display interface is switched to the third media content, which is media content that has been displayed to the current user.

As shown in FIG. 5, the predetermined media content switching can be upward swiping. If the short videos recently posted by the user's friends have been viewed by the current user and the current user has not posted new content for a long time, the second media content is switched to play. The second media content includes a dynamically played second media resource 301 that is generated using the predetermined capturing template and associated with the predetermined theme, and the second media content also includes a plurality of capturing controls 302 (predetermined controls). The user can view the capturing effects of different predetermined editing templates on the Friends interface, and conveniently and quickly select his/her favorite editing template for short video creation.

At Step 403, in response to the triggering for the predetermined control, the media material obtaining interface is entered.

For example, during a process in which the user views the second media resource 501, if the user is interested in a certain editing effect, when he/she wants to edit a short video having similar effect, he/she can click to trigger a certain editing control 502, entering the media material obtaining interface, such as a photo or video selection interface in an album.

Step 404, the media material is obtained based on the media material obtaining interface, and target content to be posted is generated using the predetermined editing template and the media material.

For example, local materials such as photos or videos can be directly selected from the media material obtaining interface, and short videos to be posted can be generated using the selected predetermined editing template and selected material. Then, the user triggers the posting button to complete the post of the new short video.

It should be noted that after triggering the predetermined control, the capturing interface can be entered to generate the target content to be posted using the currently shot image and the predetermined editing template.

According to the display method provided by the embodiment of the present disclosure, in the process of browsing media content in the media stream display interface, the user can play a media resource generated using the predetermined editing template and predetermined control in the media content, the media resource and predetermined control can prompt the user to post content associated with the predetermined theme embodied in the predetermined editing template, the user can quickly enter the media material obtaining interface by triggering the predetermined control, and use the selected media material and predetermined editing template to quickly generate media content to be posted, which can effectively reduce the difficulty in content posting, improve the enthusiasm of users to post new content, enrich media content in the application platform, which is conducive to improving activity of the users and improving the traffic efficiency of the application, and thus improve the utilization rate of related resources such as the corresponding platform or server.

Figure 6:
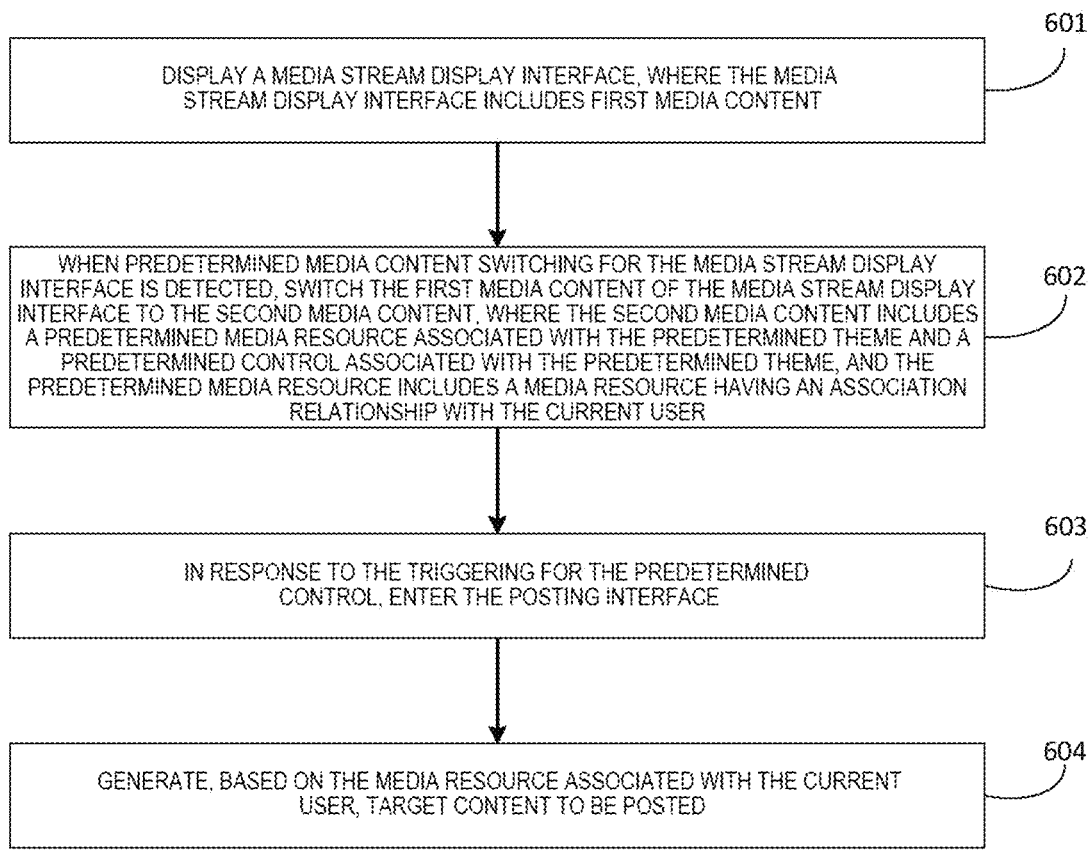
FIG. 6 is a schematic flowchart of another display method provided in the present embodiment of the present disclosure.

FIG. 6 is a schematic flowchart of another display method provided in the embodiment of the present disclosure, the present embodiment is refined based on a plurality of solutions in the above embodiment of the embodiments of the present disclosure, the method includes the following steps:

At Step 601, a media stream display interface is displayed, where the media stream display interface includes first media content.

For example, it is assumed that the media stream display interface is a Video For You interface in a short video application. The first media content is any short video in the Video For You interface.

Figure 7:
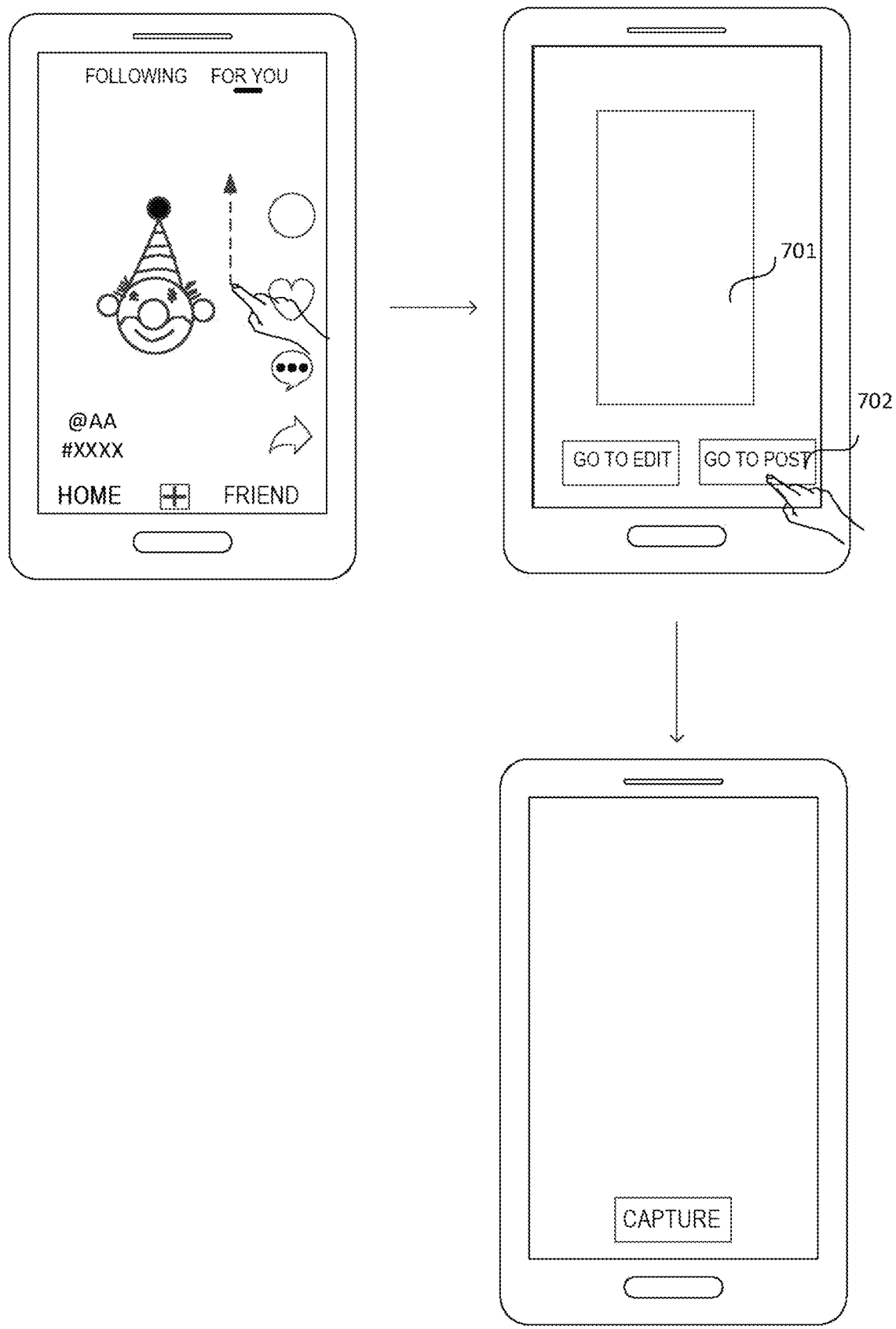
FIG. 7 is an interactive schematic diagram of a display method provided in the embodiment of the present disclosure.

FIG. 7 is an interactive schematic diagram of another display method provided in the embodiment of the present disclosure, as shown in FIG. 7, a short video containing a clown is provided in a Video For You interface.

At Step 602, when predetermined media content switching for the media stream display interface is detected, the first media content of the media stream display interface is switched to the second media content, where the second media content includes a predetermined media resource associated with the predetermined theme and a predetermined control associated with the predetermined theme, and the predetermined media resource includes a media resource having an association relationship with the current user.

As shown in FIG. 7, the predetermined media content switching can be upward swiping. The second media content is switched to for playing. The second media content includes the third media resource 701 associated with the predetermined theme and having an association relationship with the current user, and the second media content also includes a predetermined control 702.

As an example, the third media resource may include video content or music the current user likes or saves as his/her favorite.

At Step 603, in response to the triggering for the predetermined control, the posting interface is entered.

As shown in FIG. 7, the user may take a third media resource as the content to be posted and select "Go to Post", entering the posting interface. Users can also further edit the third media resource and thus select "Go to Edit".

At Step 604, target content to be posted is generated based on the media resource associated with the current user.

For example, if the user selects "to post", the predetermined application can directly generate target content to be posted based on the third media resource and display it on the posting interface. After the user clicks the posting button, the target content can be posted.

According to the display method provided by the embodiment of the present disclosure, in the process of browsing media content in the media stream display interface, the user can play a media resource and a predetermined control associated with the current user in the media content, the media resource and the predetermined control can prompt the user to post content according to the displayed media resource, and the user can quickly enter the posting interface by triggering the predetermined control, which can effectively reduce the difficulty of content posting, improve the convenience of posting operations, enrich media content in the application platform, which is conducive to improving activity of the users and improving the traffic efficiency of the application, and thus improve the utilization rate of related resources such as the corresponding platform or server.

Figure 8:
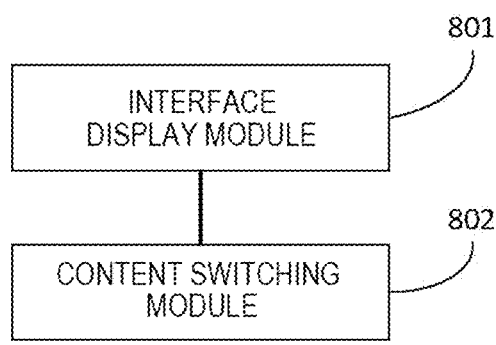
FIG. 8 is a structural block diagram of a display apparatus provided by the embodiment of the present disclosure.

FIG. 8 is a block diagram of a display apparatus according to the embodiments of the present disclosure, which can be implemented by software and/or hardware, and can generally be integrated in an electronic device, and can display media content by performing a display method. As shown in FIG. 8, the apparatus includes:

an interface display module 801 configured to display a media stream display interface, the media stream display interface including first media content, the media stream including first media content and second media content;

a content switching module 802 configured to switch the first media content of the media stream display interface to the second media content when predetermined media content switching for the media stream display interface is detected;

where the second media content includes information of a predetermined theme and a predetermined control associated with the predetermined theme, or the first media content includes information of a predetermined theme and a predetermined control associated with the predetermined theme, and the predetermined control is configured to post target content associated with the predetermined theme.

The display apparatus provided in the present embodiment of the disclosure, the media content in the media stream display interface contains information about the predetermined theme and the control associated with the predetermined theme. In the process of browsing media content in the media stream display interface by the user, the predetermined theme and corresponding control can prompt the user to post content associated with the predetermined theme, help the user determine the theme of the content to be posted, reduce the difficulty of content posting, improve the enthusiasm of users in posting new content, and then increase the probability of users in posting new content and enrich media content in the application platform, which is also conducive to improving activity of the users, improving traffic efficiency of the application, and improving the utilization rate of related resources such as the corresponding platform or server.

For example, when the second media content includes information of a predetermined theme and a predetermined control associated with the predetermined theme, the second media content includes at least one predetermined media resource associated with the predetermined theme; or when the first media content includes information of a predetermined theme and a predetermined control associated with the predetermined theme, the first media content includes at least one predetermined media resource associated with the predetermined theme.

For example, the predetermined control is configured to post the target content based on the predetermined media resource.

For example, the predetermined media resource includes a media resource having an association relationship with a current user.

For example, the predetermined media resource includes at least one predetermined template associated with the predetermined theme and/or a media resource generated using the at least one predetermined template, and the predetermined template includes generation mode information of the media resource.

For example, the predetermined template includes a predetermined capturing template and/or a predetermined editing template, the generation mode information corresponding to the predetermined capturing template includes image processing information and/or sound effect processing information involved in a process of capturing media material, the generation mode information corresponding to the predetermined editing template includes editing mode information of the media material.

For example, when the predetermined media resource includes a media resource associated with a current user, the predetermined control is configured to post the target content based on the media resource associated with the current user; and/or when the predetermined media resources include at least one predetermined template associated with the predetermined theme and/or media resource generated using the at least one predetermined template, the predetermined control is configured to the post target content based on the at least one predetermined template.

For example, the predetermined control is configured to use the media resource generated using the at least one predetermined template to post the target content.

For example, there are a plurality of the predetermined media resources;

when the second media content or the first media content is played in the media stream display interface, the interface display module is configured to sequentially play the plurality of predetermined media resources in the media stream display interface; or, display a plurality of predetermined media resources at a plurality of display positions in the media stream display interface.

For example, the apparatus may also include:

a posting process interface display module configured to display a posting process interface based on the predetermined theme, and the posting process interface includes a material selecting interface, a capturing interface or a posting interface.

For example, the apparatus also includes:

a first responding module configured to enter a media material obtaining interface in response to triggering for the predetermined control, when the posting process interface includes a material selection interface;

a first content generating module configured to obtain media material based on the media material obtaining interface, and generate target content to be posted using the predetermined editing template and the media material.

For example, the apparatus also includes:

a second responding module configured to enter a capturing interface in response to triggering for the predetermined control, when the posting process interface includes a capturing interface;

a second content generating module configured to obtain an image based on the capturing interface, and generate target content to be posted using the predetermined capturing template and the image.

For example, the apparatus also includes:

a third responding module is configured to enter the posting interface in response to triggering for the predetermined control, when the posting process interface includes the posting interface.

a third content generating module is configured to generate target content to be posted based on the media resource associated with the current user and/or the predetermined template.

Figure 9:
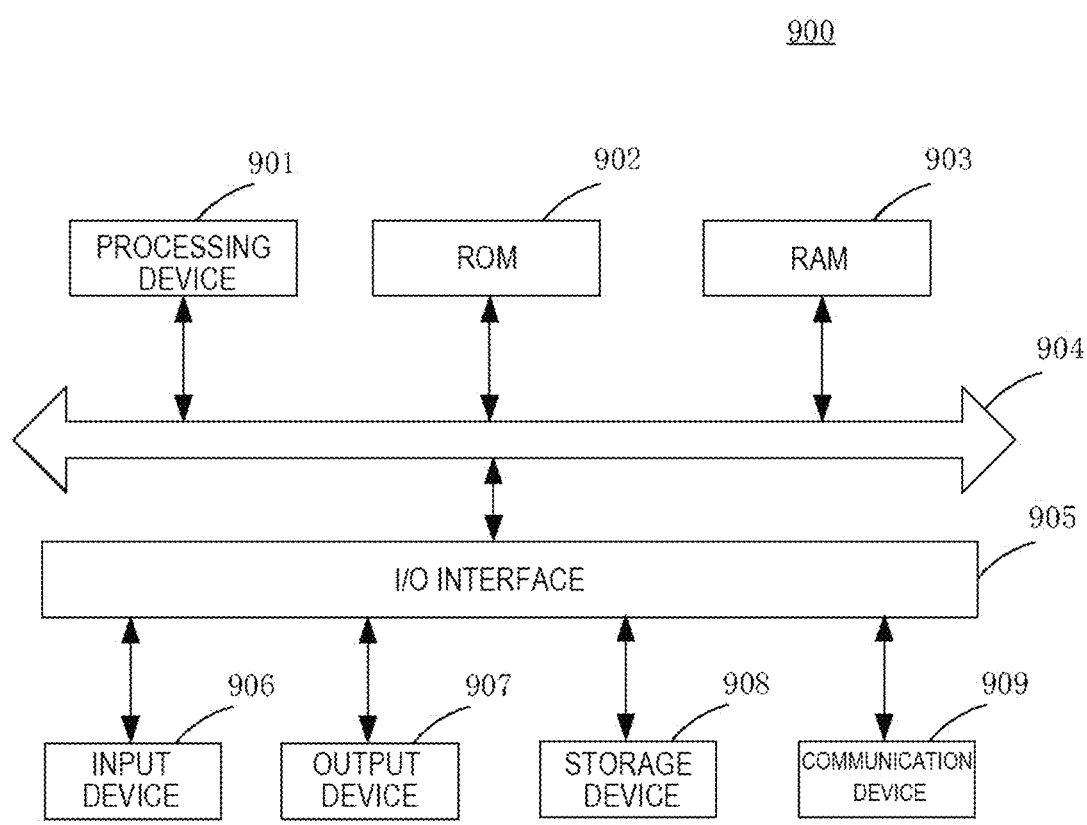
FIG. 9 is a structural block diagram of an electronic device provided by the embodiment of the present disclosure.

Referring to FIG. 9 below, it shows a structural schematic diagram of an electronic device 900 suitable for implementing the embodiment of the present disclosure. The terminal device in the embodiment of the present disclosure may include but is not limited to mobile terminals such as mobile phones, laptops, digital broadcast receivers, Personal Digital Assistants (PDAs), tablet computers (PADs), portable media players (PMPs), car-mounted terminals (such as car navigation terminals), etc. and fixed terminals such as digital televisions TV, desktop computers, etc. The electronic device shown in FIG. 10 is only an example and should not bring any limitation on the functionality and scope of use of the embodiment of the present disclosure.

As shown in FIG. 9, the electronic device 900 may include a processing device (such as a central processing unit, graphics processing unit, etc.) 901, which may perform various appropriate actions and processes based on programs stored in Read-Only Memory (ROM) 902 or loaded from storage device 908 into Random Access Memory (RAM) 903. In the RAM 903, various programs and data necessary for the operation of the electronic device 900 are also stored. The processing device 901, ROM 902, and RAM 903 are connected to each other through a bus 904. An Input/Output I/O interface 905 is also connected to the bus 904.

Typically, the following devices can be connected to I/O interface 905: input device 906 including, for example, touch screens, touchpads, keyboards, mice, cameras, microphones, accelerometers, gyroscopes, etc.; output device 907 including LCDs (liquid crystal displays), speakers, vibrators, etc.; storage device 908 including magnetic tapes, hard disks, etc.; and a communication apparatus 909. The communication apparatus 909 may allow the electronic device 900 to communicate with other devices wirelessly or wirelessly to exchange data. Although FIG. 9 shows an electronic device 900 with a plurality of devices, it shall be understood that it is not required to implement or have all of the devices shown. More or fewer devices can be implemented or provided instead.

According to embodiments of the present disclosure, the process described above with reference to the flowchart can be implemented as a computer software program. For example, an embodiment of the present disclosure includes a computer program product that includes a computer program carried on a non-transitory computer-readable medium, where the computer program includes program code configured for performing the method shown in the flowchart. In such an embodiment, the computer program can be downloaded and installed from a network through the communication apparatus 909, or installed from the storage apparatus 908, or installed from the ROM 902. When the computer program is executed by the processing apparatus 901, the above functions defined in the method of the embodiment of the present disclosure are performed.

It should be noted that the computer-readable medium described above can be a computer-readable signal medium or a computer-readable storage medium, or any combination thereof. The computer-readable storage medium can be, for example, but not limited to, an electrical, magnetic, optical, electromagnetic, infrared, or semiconductor system, apparatus, or device, or any combination thereof. Specific examples of computer-readable storage media may include but are not limited to: an electrical connection with one or more wires, a portable computer disk, a hard disk, random access memory (RAM), read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium containing or storing a program that can be used by an instruction execution system, apparatus, or device, or can be used in combination with an instruction execution system, apparatus, or device. In the present disclosure, a computer-readable signal medium can include a data signal propagated in baseband or as part of a carrier wave, which carries computer-readable program code therein. Such propagated data signals may take many forms, including but not limited to electromagnetic signals, optical signals, or any suitable combination thereof. A computer-readable signal medium may also be any computer-readable medium other than a computer-readable storage medium, which can send, propagate, or transmit programs for use by or in conjunction with instruction execution systems, apparatus, or devices. The program code contained on the computer-readable medium may be transmitted using any suitable medium, including but not limited to: wires, optical cables, radio frequency (RF), etc., or any suitable combination thereof.

The computer-readable medium can be included in the electronic device, or it can exist alone without being assembled into the electronic device.

The above-mentioned computer-readable medium carries one or more programs, and when the above-mentioned one or more programs are executed by the electronic device, the electronic device: display a media stream display interface, where the media stream display interface includes first media content, and the media stream includes first media content and second media content; and switch the first media content of the media stream display interface to the second media content when predetermined media content switching for the media stream display interface is detected; where the second media content includes information of a predetermined theme and a predetermined control associated with the predetermined theme, or the first media content includes information of a predetermined theme and a predetermined control associated with the predetermined theme, and the predetermined control is configured to post target content associated with the predetermined theme.

Computer program codes for performing the operations of the present disclosure may be written in one or more programming languages or a combination thereof, including but not limited to Object Oriented programming languages—such as Java, Smalltalk, C++, and also conventional procedural programming languages—such as "C" or similar programming languages. The program code may be executed entirely on the user's computer, partially executed on the user's computer, executed as a standalone software package, partially executed on the user's computer and partially on a remote computer, or entirely on a remote computer or server. In the case of involving a remote computer, the remote computer may be any kind of network—including local area network (LAN) or wide area network (WAN)—connected to the user's computer, or may be connected to an external computer (e.g., through an Internet service provider to connect via the Internet).

The flowcharts and block diagrams in the accompanying drawings illustrate the architecture, functions, and operations of possible implementations of the system, method, and computer program product according to a plurality of embodiments of the present disclosure. In this regard, each block in a flowchart or block diagram may represent a module, program segment, or portion of code that contains one or more executable instructions for implementing a specified logical function. It should also be noted that in some alternative implementations, the functions marked in the blocks may occur in a different order than those marked in the drawings. For example, two consecutive blocks may actually be executed in parallel, or they may sometimes be executed in reverse order, depending on the function involved. It should also be noted that each block in the block diagrams and/or flowcharts, as well as combinations of blocks in the block diagrams and/or flowcharts, may be implemented using a dedicated hardware-based system that performs the specified function or operations, or may be implemented using a combination of dedicated hardware and computer instructions.

The modules described in the embodiments of the present disclosure may be implemented by means of software or hardware, and the name of the module does not constitute a limitation on the module itself in a certain case, for example, an interface displaying module may also be described as "a module for displaying a media stream display interface, the media stream display interface including first media content, the media stream including first media content and second media content".

The functions described herein above can be performed at least in part by one or more hardware logic components. For example, without limitation, exemplary types of hardware logic components that may be used include: Field Programmable Gate Arrays (FPGAs), Application Specific Integrated Circuits (ASICs), Application Specific Standard Parts (ASSPs), System on Chip (SOCs), Complex Programmable Logic Devices (CPLDs), and so on.

In the context of this disclosure, a machine-readable medium can be a tangible medium that may contain or store programs for use by or in conjunction with instruction execution systems, apparatuses, or devices. A machine-readable medium may be a machine-readable signal medium or a machine-readable storage medium. A machine-readable medium may include, but are not limited to, electronic, magnetic, optical, electromagnetic, infrared, or semiconductor systems, apparatuses, or devices, or any suitable combination thereof. Specific examples of the machine-readable storage medium may include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination thereof.

According to one or more embodiments of the present disclosure, there is provided a display method including:
  displaying a media stream display interface, the media stream display interface including first media content, the media stream including first media content and second media content;
  when predetermined media content switching for the media stream display interface is detected, switching the first media content of the media stream display interface to the second media content;
  where the second media content includes information of a predetermined theme and a predetermined control associated with the predetermined theme, or the first media content includes information of a predetermined theme and a predetermined control associated with the predetermined theme, and the predetermined control is configured to post target content associated with the predetermined theme.

According to one or more embodiments of the present disclosure, when the second media content includes information of a predetermined theme and predetermined controls associated with the predetermined theme, the second media content includes at least one predetermined media resource associated with the predetermined theme; or when the first media content includes information of a predetermined theme and predetermined controls associated with the predetermined theme, the first media content includes at least one predetermined media resource associated with the predetermined theme.

According to one or more embodiments of the present disclosure, the predetermined control is configured to post the target content based on the predetermined media resource.

According to one or more embodiments of the present disclosure, the predetermined media resource includes a media resource having an association relationship with the current user.

According to one or more embodiments of the present disclosure, the predetermined media resource includes at least one predetermined template associated with the predetermined theme and/or a media resource generated using the at least one predetermined template, the predetermined template includes generation mode information of the media resource.

According to one or more embodiments of the present disclosure, the predetermined template includes at least one of a predetermined capturing template or a predetermined editing template, and the generation mode information corresponding to the predetermined capturing template includes at least one of image processing information or sound effect processing information involved in a process of capturing media material, the generation mode information corresponding to the predetermined editing template includes editing mode information of the media material.

According to one or more embodiments of the present disclosure, when the predetermined media resource includes a media resource associated with the current user, the predetermined control is configured to post the target content based on the media resource associated with the current user; and/or, when the predetermined media resource includes at least one predetermined template associated with the predetermined topic and/or a media resource generated using the at least one predetermined template, the predetermined control is configured to post the target content based on the at least one predetermined template.

According to one or more embodiments of the present disclosure, the predetermined control is arranged to use the media resource using the at least one predetermined template generated posting target content.

According to one or more embodiments of the present disclosure, there are a plurality of the predetermined media resources; where when the second media content or the first media content is played in the media stream display interface, the method includes:
  sequentially playing the plurality of predetermined media resources in the media stream display interface; or,
  displaying a plurality of predetermined media resources at a plurality of display positions in the media stream display interface.

According to one or more embodiments of the present disclosure, after displaying the predetermined control, the method further including:
  displaying a posting process interface based on the predetermined theme, wherein the posting process interface includes a material selecting interface, a capturing interface or a posting interface.

According to one or more embodiments of the present disclosure, when the posting process interface includes the material selecting interface, the method further includes:
  in response to triggering for the predetermined control, entering a media material obtaining interface;
  obtaining media material based on the media material obtaining interface, and generating target content to be posted using the predetermined editing template and the media material; or
  when the posting process interface includes the capturing interface, the method further includes:
  in response to triggering for the predetermined control, entering the capturing interface;

obtaining an image based on the capturing interface, and generating target content to be posted using the predetermined capturing template and the image; or when the posting process interface includes a posting interface, the method further includes:

in response to triggering for the predetermined control, entering the posting interface;

generating target content to be posted based on at least one of the media resource associated with the current user or the predetermined template.

According to one or more embodiments of the present disclosure, there is provided a display apparatus including:

an interface display module configured to display a media stream display interface, wherein the media stream display interface includes first media content, and the media stream includes first media content and second media content;

a content switching module configured to switch the first media content of the media stream display interface to the second media content upon detection of predetermined media content switching for the media stream display interface;

wherein the second media content includes information of a predetermined theme and a predetermined control associated with the predetermined theme, or the first media content includes information of a predetermined theme and a predetermined control associated with the predetermined theme, and the predetermined control is configured to post target content associated with the predetermined theme.

In addition, although a plurality of operations are depicted in a specific order, this should not be understood as requiring these operations to be performed in the specific order shown or in a sequential order. In certain environments, multitasking and parallel processing may be advantageous. Similarly, although a plurality of implementation details are included in the above discussion, these should not be construed as limiting the scope of the present disclosure. Some features described in the context of individual embodiments can also be implemented in combination in a single embodiment. Conversely, a plurality of features described in the context of a single embodiment can also be implemented in a plurality of embodiments separately or in any suitable sub-combination.

We claim:

1. A method, comprising:
    displaying first media content on an interface during a process of browsing media content by a user, the interface configured to play a media stream;
    determining whether a content containing a predetermined theme has been posted by or played for the user within a predetermined period;
    switching to display second media content from the first media content on the interface in response to determining that the content containing the predetermined theme has not been posted by or played for the user within the predetermined period, wherein the second media content comprises a predetermined media resource indicative of the predetermined theme, and the second media content further comprises a predetermined control associated with the predetermined theme; and
    generating target content based on the predetermined media resource in response to receiving an operation performed on the predetermined control, wherein the target content is associated with the predetermined theme.

2. The method of claim 1, wherein the predetermined control is configured to post the target content based on the predetermined media resource.

3. The method of claim 1, wherein the predetermined media resource comprises a media resource having an association relationship with a current user.

4. The method of claim 3, comprising at least one of the following:
    the predetermined control being configured to post the target content based on the media resource associated with the current user if the predetermined media resource comprises a media resource associated with a current user; or
    the predetermined control being configured to post the target content based on the at least one predetermined template if the predetermined media resource comprises at least one of: at least one predetermined template associated with the predetermined theme, or a media resource generated using the at least one predetermined template.

5. The method of claim 1, wherein the predetermined media resource comprises at least one of: at least one predetermined template associated with the predetermined theme, or a media resource generated using the at least one predetermined template;
    wherein the predetermined template comprises generation mode information of the media resource.

6. The method of claim 5, wherein the predetermined template comprises at least one of a predetermined capturing template or a predetermined editing template, and generation mode information corresponding to the predetermined capturing template comprises at least one of image processing information or sound effect processing information involved in a process of capturing media material, the generation mode information corresponding to the predetermined editing template comprises editing mode information of the media material.

7. The method of claim 6, after displaying the predetermined control, the method further comprising:
    displaying a posting process interface based on the predetermined theme, wherein the posting process interface comprises a material selecting interface, a capturing interface or a posting interface.

8. The method of claim 7, comprising one of the following:
    in response to determining that the posting process interface comprises the material selecting interface, the method further comprising: in response to triggering for the predetermined control, entering a media material obtaining interface; obtaining the media material based on the media material obtaining interface, and generating the target content to be posted using the predetermined editing template and the media material;
    in response to determining that the posting process interface comprises the capturing interface, the method further comprising: in response to triggering for the predetermined control, entering the capturing interface; obtaining an image based on the capturing interface, and generating the target content to be posted using the predetermined capturing template and the image; and
    in response to determining that the posting process interface comprises the posting interface, the method further comprising: in response to triggering for the predetermined control, entering the posting interface;
    generating the target content to be posted based on at least one of the media resource associated with the current user or the predetermined template.

9. The method of claim 5, wherein the predetermined control is configured to use the media resource generated using the at least one predetermined template to post the target content.

10. The method of claim 1, wherein the at least one predetermined media resource comprises a plurality of the predetermined media resources;
wherein in response to determining that the second media content or the first media content is played in the media stream display interface, the method comprises:
sequentially playing the plurality of predetermined media resources in the media stream display interface; or
displaying a plurality of predetermined media resources at a plurality of display positions in the media stream display interface.

11. An electronic device comprising a memory, a processor, and a computer program stored on the memory and runnable on the processor, the processor, upon executing the computer program, performing:
displaying first media content on an interface during a process of browsing media content by a user, the interface configured to play a media stream;
determining whether a content containing a predetermined theme has been posted by or played for the user within a predetermined period;
switching to display second media content from the first media content on the interface in response to determining that the content containing the predetermined theme has not been posted by or played for the user within the predetermined period, wherein the second media content comprises a predetermined media resource indicative of the predetermined theme, and the second media content further comprises a predetermined control associated with the predetermined theme; and
generating target content based on the predetermined media resource in response to receiving an operation performed on the predetermined control, wherein the target content is associated with the predetermined theme.

12. The electronic device of claim 11, wherein the predetermined control is configured to post the target content based on the predetermined media resource.

13. The electronic device of claim 11, wherein the predetermined media resource comprises a media resource having an association relationship with a current user.

14. The electronic device of claim 13, comprising at least one of the following:
the predetermined control being configured to post the target content based on the media resource associated with the current user if the predetermined media resource comprises a media resource associated with a current user; or
the predetermined control being configured to post the target content based on the at least one predetermined template if the predetermined media resource comprises at least one of: at least one predetermined template associated with the predetermined theme, or a media resource generated using the at least one predetermined template.

15. The electronic device of claim 11, wherein the predetermined media resource comprises at least one of: at least one predetermined template associated with the predetermined theme, or a media resource generated using the at least one predetermined template;
wherein the predetermined template comprises generation mode information of the media resource.

16. The electronic device of claim 15, wherein the predetermined template comprises at least one of a predetermined capturing template or a predetermined editing template, and generation mode information corresponding to the predetermined capturing template comprises at least one of image processing information or sound effect processing information involved in a process of capturing media material, the generation mode information corresponding to the predetermined editing template comprises editing mode information of the media material.

17. The electronic device of claim 15, wherein the predetermined control is configured to use the media resource generated using the at least one predetermined template to post the target content.

18. A non-transitory computer-readable storage medium having a computer program stored thereon, the computer program, upon executed by a processor, performing:
displaying first media content on an interface during a process of browsing media content by a user, the interface configured to play a media stream;
determining whether a content containing a predetermined theme has been posted by or played for the user within a predetermined period;
switching to display second media content from the first media content on the interface in response to determining that the content containing the predetermined theme has not been posted by or played for the user within the predetermined period, wherein the second media content comprises a predetermined media resource indicative of the predetermined theme, and the second media content further comprises a predetermined control associated with the predetermined theme; and
generating target content based on the predetermined media resource in response to receiving an operation performed on the predetermined control, wherein the target content is associated with the predetermined theme.

* * * * *